US011750700B2

(12) United States Patent
Mullick et al.

(10) Patent No.: US 11,750,700 B2
(45) Date of Patent: Sep. 5, 2023

(54) METHOD, DEVICE, COMPUTER-READABLE MEDIUM, AND SYSTEM FOR MANAGING TRANSACTIONS

(71) Applicant: Samsung Electronics Co., Ltd., Suwon-si (KR)

(72) Inventors: Vikalp Mullick, Bangalore (IN); Mainak Choudhury, Bangalore (IN); Amogha D Shanbhag, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 17/288,697

(22) PCT Filed: Oct. 24, 2019

(86) PCT No.: PCT/KR2019/014097
§ 371 (c)(1),
(2) Date: Apr. 26, 2021

(87) PCT Pub. No.: WO2020/085825
PCT Pub. Date: Apr. 30, 2020

(65) Prior Publication Data
US 2022/0004318 A1    Jan. 6, 2022

(30) Foreign Application Priority Data

Oct. 24, 2018 (IN) .............................. 201841040192
Sep. 18, 2019 (IN) .............................. 201841040192

(51) Int. Cl.
*H04L 67/1097* (2022.01)

(52) U.S. Cl.
CPC ................... *H04L 67/1097* (2013.01)

(58) Field of Classification Search
CPC ... H04L 67/1097; H04L 9/50; H04L 67/1091; H04L 67/01; G06F 3/064
See application file for complete search history.

(56) References Cited

U.S. PATENT DOCUMENTS 9,195,600 B2    11/2015    Adl-Tabatabai et al.
9,882,985 B1     1/2018    Esam et al.
(Continued)

FOREIGN PATENT DOCUMENTS

CN       108269072 A     7/2018
KR   10-2012-0103715 A   9/2012
(Continued)

OTHER PUBLICATIONS

Tian, Xin-xue, CN 107809484 A "Block Chain Processing Method of Transaction Information and Block Chain Node", FIT translation (Year: 2018).*

(Continued)

*Primary Examiner* — Jonathan A Bui
(74) *Attorney, Agent, or Firm* — Jefferson IP Law, LLP

(57) ABSTRACT

The present disclosure may provide a device including: a memory storing instructions, and a processor configured to execute the instructions to: initiate a transaction, obtain location information of at least one data block, corresponding to the transaction, of a plurality of data blocks, perform fragmentation by splitting the transaction into a plurality of transaction fragments based on the location information, and transmit the plurality of transaction fragments to other devices where the at least one data block is stored.

15 Claims, 12 Drawing Sheets

(56) References Cited

U.S. PATENT DOCUMENTS

| | | |
|---|---|---|
| 2010/0257146 A1 | 10/2010 | Memon et al. |
| 2015/0261607 A1 | 9/2015 | Hansen |
| 2015/0286470 A1 | 10/2015 | Dahan |
| 2015/0310030 A1 | 10/2015 | Balmin et al. |
| 2016/0028552 A1 | 1/2016 | Spanos et al. |
| 2017/0031676 A1 | 2/2017 | Cecchetti et al. |
| 2018/0019867 A1 | 1/2018 | Davis |
| 2018/0294955 A1 | 10/2018 | Rhie et al. |
| 2021/0034455 A1* | 2/2021 | Deng .................. H03M 7/60 |

FOREIGN PATENT DOCUMENTS

| | | |
|---|---|---|
| KR | 10-1727525 B1 | 4/2017 |
| KR | 10-1882347 B1 | 7/2018 |
| KR | 10-2018-0113140 A | 10/2018 |
| WO | 2018/020373 A1 | 2/2018 |

OTHER PUBLICATIONS

International Search Report dated Feb. 4, 2020, issued in International Patent Application No. PCT/KR2019/014097.
European Search Report dated Nov. 9, 2021, issued in European Patent Application No. 19874837.8.

* cited by examiner

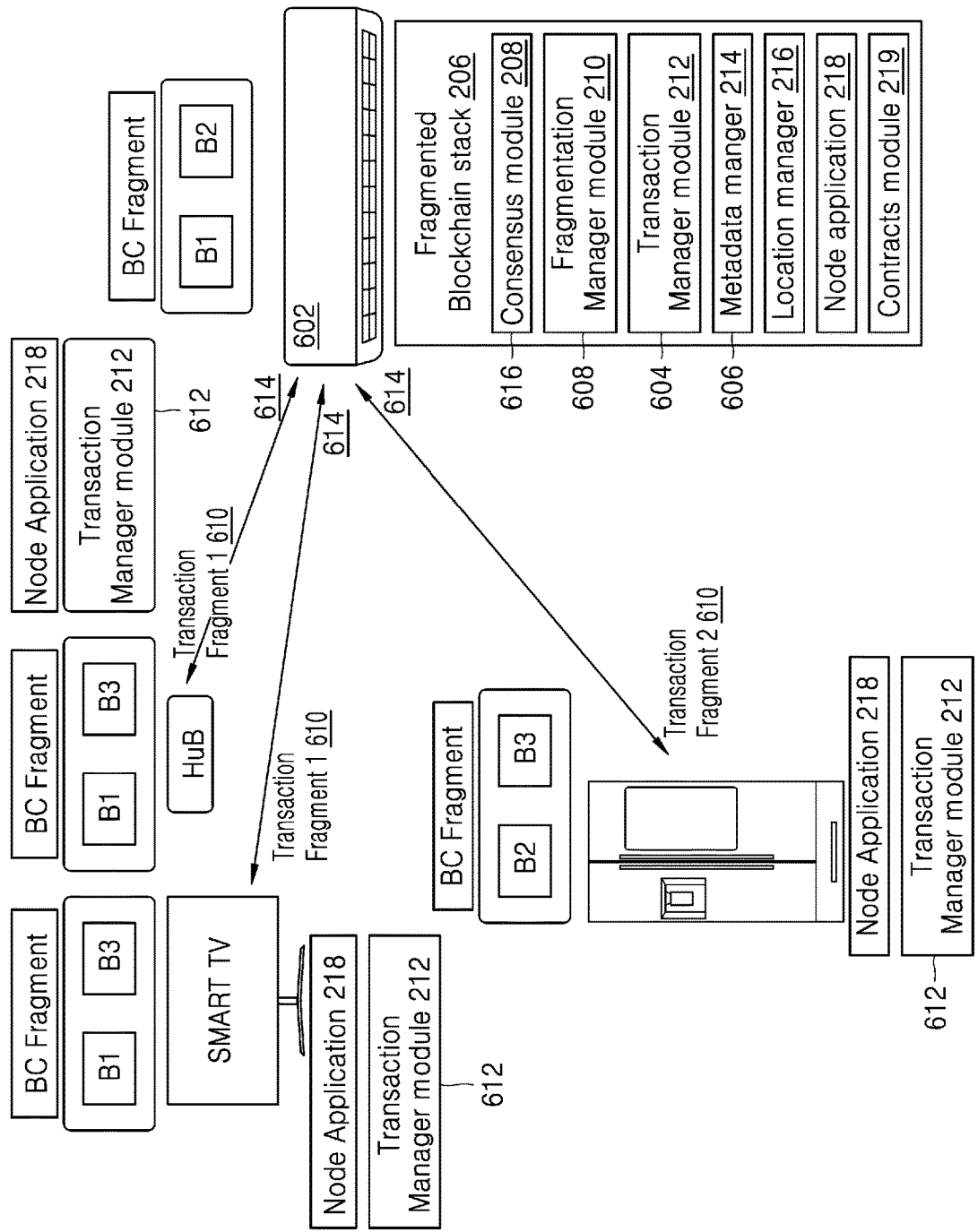

METHOD, DEVICE, COMPUTER-READABLE MEDIUM, AND SYSTEM FOR MANAGING TRANSACTIONS

TECHNICAL FIELD

The present disclosure relates to managing transactions on a network, and more particularly, to managing transactions on a network including Internet of Things (IoT) devices.

BACKGROUND ART

A smart home or IoT ecosystem includes a master device for managing the ecosystem as in a client-server model. As the number of devices in the ecosystem increases, security of user data and devices in the ecosystem is critical. However, the master device may become a single point of failure (SPOF), and since an attack surface grows exponentially due to an increasing number of IoT devices connected to the network, it is difficult to maintain or strengthen security of the IoT devices.

To maintain security of IoT devices, security applications may run on all devices within the IoT ecosystem, which, however, may increase use of computing resources and power consumption, and thus, this approach would not be feasible in the IoT ecosystem due to limited processing and memory capabilities of the IoT devices.

DESCRIPTION OF EMBODIMENTS

Solution to Problem

The present disclosure may provide a device including: a memory storing instructions; and a processor configured to execute the instructions to: initiate a transaction; obtain location information of at least one data block, corresponding to the transaction, of a plurality of data blocks; fragment the transaction into a plurality of transaction fragments based on the location information; and transmit the plurality of transaction fragments to other devices where the at least one data block is stored.

BRIEF DESCRIPTION OF DRAWINGS

Embodiments are shown in the accompanying drawings, and like reference numerals denote corresponding parts in various drawings. Embodiments will be better understood from the following description with reference to the drawings.

FIG. 6A shows a use case example according to an embodiment;

MODE OF DISCLOSURE

Figure 1:
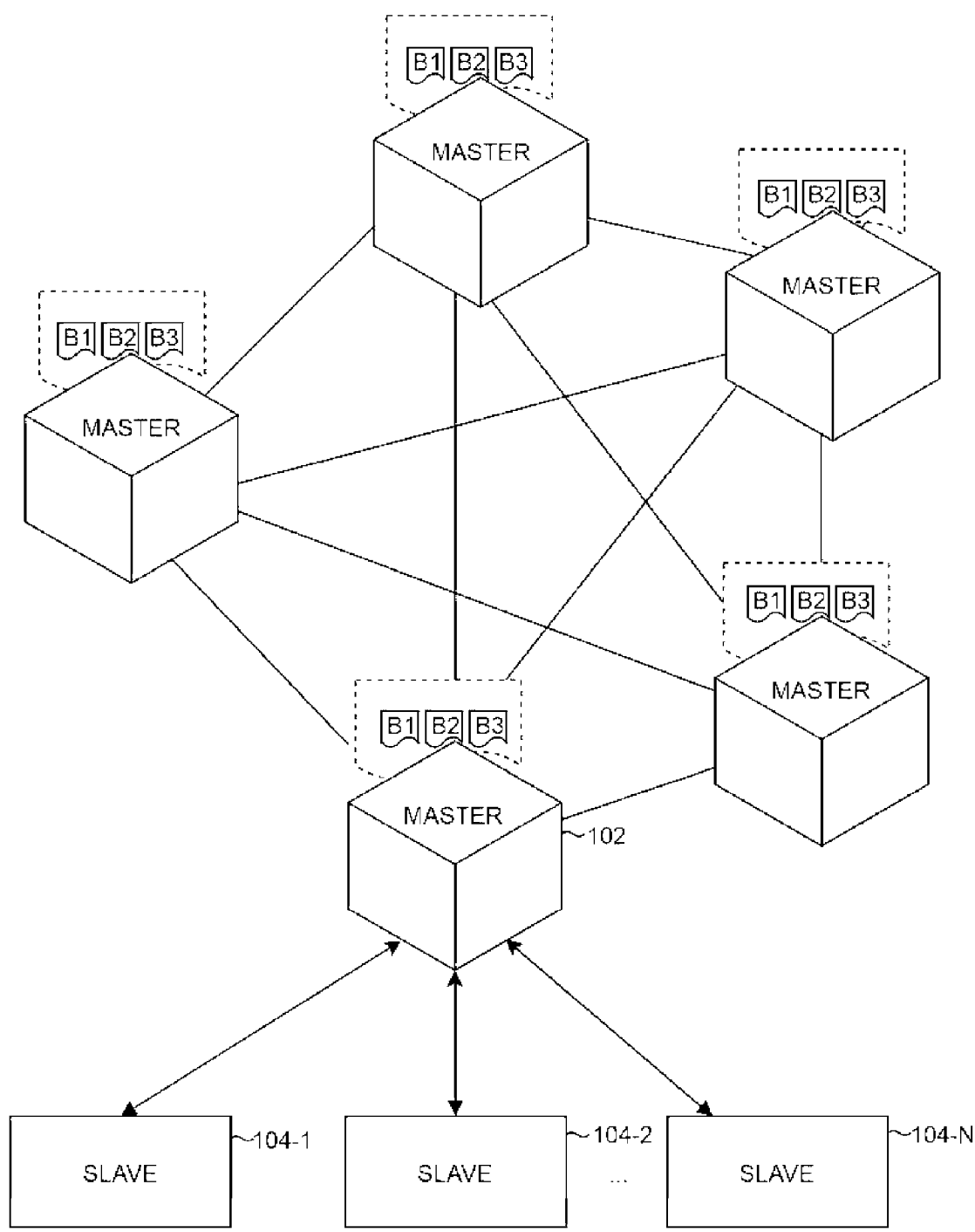
FIG. 1 shows a blockchain-based Internet of Things (IoT) system according to an embodiment.

The present disclosure may provide a device including: a memory storing instructions; and a processor configured to execute the instructions to: initiate a transaction; obtain location information of at least one data block, corresponding to the transaction, of a plurality of data blocks; fragment the transaction into a plurality of transaction fragments based on the location information; and transmit the plurality of transaction fragments to other devices where the at least one data block is stored.

The transaction may include an interaction between a plurality of devices including the device and the other devices.

The transaction may be related to an operation history of one of the plurality of devices including the device and the other devices.

The memory may include an area allocated for storing a data block.

The plurality of data blocks may form a blockchain.

The plurality of data blocks may be distributed to a plurality of devices including the device and the other devices.

The distribution of the plurality of data blocks may be based on a contract between a plurality of devices including the device and the other devices.

Pieces of metadata of the plurality of data blocks may be stored in a plurality of devices including the device and the other devices.

The processor may be further configured to execute the instructions to obtain location information of the data block from its metadata.

The pieces of metadata may be stored in a server other than the device and the other devices.

The plurality of data blocks may include data blocks duplicated on the device and the other devices.

The number of data blocks duplicated on a plurality of devices including the device and the other devices may be set by a user.

The processor may be further configured to execute the instructions to receive responses to the plurality of transaction fragments from the other devices.

The processor may be further configured to execute the instructions to transmit, when the at least one data block is duplicated on at least two devices of the other devices, the same transaction fragment to the at least two devices.

When responses to the plurality of transaction fragments are received from the other devices, the processor may be further configured to execute the instructions to evaluate the received responses based on a consensus algorithm.

The processor may be further configured to execute the instructions to: determine whether a data block stored in the device is able to the transaction; and when the data block stored in the device is not able to respond to the transaction, obtain the location information of the at least one data block corresponding to the transaction.

The processor may be further configured to execute the instructions to: perform fragmentation on a data block resulting from the transaction to generate fragmented data blocks; associate the fragmented data blocks with metadata; and store, based on the metadata, the fragmented data blocks in a plurality of devices including the device and the other devices.

The processor may be further configured to execute the instructions to: determine a size of the data block resulting from the transaction; and based on a result of determining whether the memory is able to accommodate the determined size, generate the fragmented data blocks by perform fragmentation on the data block resulting from the transaction.

Furthermore, the present disclosure may provide a method including: initiating a transaction by a first device; obtaining, by the first device, location information of at least one data block, corresponding to the transaction, of a plurality of data blocks; fragmenting, by the first device, the transaction into a plurality of transaction fragments based on the location information; and transmitting the plurality of transaction fragments from the first device to second devices where the at least one data block is stored.

In addition, the present disclosure may provide a computer-readable recording medium having recorded thereon instructions that, when executed by an electronic device, cause the electronic device to perform the method.

Embodiments provide a server-free method for managing a transaction in a blockchain-based IoT ecosystem. The first device initiates at least one transaction. The first device determines whether one or more data blocks stored therein can provide a result corresponding to the at least one transaction. When the first device determines that the one or more data blocks stored in the first device cannot provide a result corresponding to the at least one transaction, the first device identifies at least one fragmented data block corresponding to the at least one transaction and stored in one or more second devices. The first device retrieves metadata and at least one location of the at least one fragmented data block in the one or more second devices. The first device fragments, based on the metadata and the at least one location of the at least one fragmented data block, the at least one transaction into a plurality of transaction fragments. The first device transmits the plurality of transaction fragments to the one or more second devices.

Embodiments provide a server-free system for managing transactions in a blockchain IoT ecosystem. The server-free system includes a first device and one or more second devices coupled to the first device. The first device is configured to initiate at least one transaction. The first device is configured to determine whether one or more data blocks stored therein can provide a result corresponding to the at least one transaction. When the first device determines that the one or more data blocks stored in the first device cannot provide a result corresponding to the at least one transaction, the first device identifies at least one fragmented data block corresponding to at least one transaction and stored in the one or more second devices. The first device retrieves at least one location of the at least one fragmented data block from metadata and the one or more second devices. The first device fragments the at least one transaction into a plurality of transaction fragments based on the metadata and the at least one location of the at least one fragmented data block. The first device transmits the plurality of transaction fragments to the one or more second devices.

Embodiments provide a device for managing transactions in a blockchain-based IoT ecosystem. The device includes a fragmented blockchain stack. The fragmented blockchain stack includes a fragmentation manager module and a transaction manager module executed by a processor. The processor is configured to initiate at least one transaction. The processor determines whether one or more data blocks stored in the device can provide a result corresponding to at least one transaction. When the first device determines that the one or more data blocks stored in the first device cannot provide a result corresponding to the at least one transaction, the first device identifies at least one fragmented data block corresponding to at least one transaction and stored in the one or more second devices. The first device retrieves at least one location of the at least one fragmented data block from metadata and the one or more second devices. The first device fragments the at least one transaction into a plurality of transaction fragments based on the metadata and the at least one location of the at least one fragmented data block. The first device transmits the plurality of transaction fragments to the one or more second devices.

Embodiments provide a server-free method for managing data in a blockchain-based IoT ecosystem. A first device measures a size of an output blockchain data block generated from at least one transaction on blockchain data to be stored in the first device coupled to one or more second devices. The first device detects that its storage capacity is not large enough to accommodate the measured size of the output blockchain data block. The first device fragments the output blockchain data block into a plurality of data blocks in order to obtain a plurality of fragmented data blocks. The first device associates metadata with each of the plurality of fragmented data blocks. The first device stores the plurality of fragmented data blocks in at least one of the first device and the one or more second devices.

Accordingly, embodiments provide a server-free system for managing data in a blockchain IoT ecosystem. The server-free system includes a first device and one or more second devices coupled to the first device. The first device measures a size of an output blockchain data block created by at least one transaction on blockchain data to be stored in the first device coupled to one or more second devices. The first device detects that its storage capacity is not large enough to accommodate the measured size of the output blockchain data block. The first device fragments the output blockchain data block into a plurality of data blocks in order to obtain a plurality of fragmented data blocks. The first device associates metadata with each of the plurality of fragmented data blocks. The first device stores the plurality of fragmented data blocks in at least one of the first device and the one or more second devices.

Exemplary embodiments and their various features, and advantageous details are described more fully with reference to non-limiting embodiments shown in the accompanying drawings and described in the detailed description below. Descriptions of well-known components and processing techniques are omitted so as not to unnecessarily obscure the embodiments. This description is only intended to facilitate understanding of a method capable of implementing the exemplary embodiments so that those skilled in the art may practice the exemplary embodiments. Accordingly, the present disclosure should not be construed as limiting the scope of the exemplary embodiments.

As the terms used herein, general terms that are currently widely used are selected by taking functions according to various embodiments into account, but the terms may have different meanings according to the intention of one of ordinary skill in the art, precedent cases, or the appearance of new technologies. Furthermore, some terms may be arbitrarily selected by the applicant, and in this case, the meaning of the selected terms will be described in detail in the detailed description of an embodiment. Thus, the terms used herein should be defined not by simple appellations thereof but based on the meaning of the terms together with the overall description of the present disclosure.

Singular expressions used herein are intended to include plural expressions as well, unless the context clearly indicates them as singular. It should be understood that the term "comprise" or "have" is intended to indicate the presence of a feature, a number, a step, an operation, a component, a part, or a combination thereof, and one or more other features and does not exclude the possibility of the presence or addition of one or more other features, numbers, steps, operations, components, parts, or a combination thereof. In particular, numbers are presented as examples for assisting in understanding, and embodiments should not be understood as being limited by the numbers.

In addition, terms such as " . . . portion", "module", and "manager" described in the specification refer to a unit for processing at least one function or operation and may be implemented using hardware or software, or a combination of hardware and software.

It will be understood that, although the terms including an ordinal number such as "first", "second", etc. may be used herein to describe various elements, these elements should not be limited by the terms. The terms are only used to distinguish one element from another element. Thus, a "first element" mentioned below may be termed a "second element" without departing from the technical idea of an embodiment.

Expressions such as "at least one of," when preceding a list of elements, modify the entire list of elements and do not modify the individual elements of the list. For example, the expression "at least one of a, b and c" indicates only a, only b, only c, both a and b, both a and c, both b and c, all of a, b, and c, or combinations thereof.

A blockchain uses a decentralized system and a distributed ledger. A transaction between nodes constituting a network may be verified by each device and recorded across all nodes of the network.

FIG. 1 illustrates a blockchain-based IoT system according to an embodiment.

The blockchain-based IoT system includes a master device 102 coupled with a plurality of slave devices 104-1, 104-2, . . . , and 104-N. The master device 102 may be, for example, a high configuration server. The slave devices 104-1, 104-2, . . . , and 104-N may be, for example, IoT devices such as a smart television (TV), a mobile phone, an air conditioner, a smart watch, etc. IoT devices include a controlled device as well as a controlling device.

In the blockchain-based IoT system, the master device 102 stores a complete blockchain. That is, the master device 102 stores all blocks B1, B2, and B3. The master device 102 may share a created block with other master devices, and each master device may store all the blocks B1, B2, and B3, thereby guaranteeing trust in data included in the blocks B1, B2, and B3, e.g., transactions. In the present disclosure, a data block may be one block, but may refer to a plurality of blocks.

In such a blockchain-based IoT-based system, the master device 102 is not treated equally to the slave devices 104-1, 104-2, . . . , and 104-N. A high configuration server for storing all the blocks B1, B2, and B3 that forms a blockchain acts as a master device. In other words, in order to perform a certain operation or transaction, the slave devices 104-1, 104-2, . . . , and 104-N communicate with one another via the master device 102, and when the master device 102 does not operate, a normal operation of the slave devices 104-1, 104-2, . . . , and 104-N may not be guaranteed. That is, such a failure of the master device 102 may cause the entire network to fail.

In order to implement a blockchain-based IoT system on a client side as well, storing all blocks B1, B2, and B3 in the slave devices 104-1,104-2, . . . , and 104-N may be taken into consideration. However, due to the lack of memory capacity for each device, all the slave devices 104-1, 104-2, . . . , and 104-N in the network may not store all data constituting the blockchain.

The main task of embodiments is to provide methods and systems for managing transactions in a blockchain-based IoT environment.

Another task of the embodiments is to provide a method and system for server-free data management in a blockchain-based IoT environment.

Another task of the embodiments is to provide methods and systems for managing blockchain data blocks and transactions in a blockchain-based IoT environment, wherein blockchain data is fragmented and blocks may be stored in a plurality of nodes in a distributed fashion.

The embodiments achieve methods and systems for providing fragmented blockchain and fragmented transaction in a blockchain-based IoT environment. The same or similar reference numerals may indicate corresponding features throughout the drawings, but are not limited thereto.

In a blockchain IoT environment, an action or transaction is fragmented into a plurality of smaller transactions, and each transaction fragment is migrated to a node having a corresponding information block.

Nodes may refer to devices connected to a network, but are not limited thereto. For example, nodes may indicate devices capable of performing an operation according to an embodiment of the present disclosure in a network, or indicate devices registered in the same user profile.

A transaction may refer to an act of adding or deleting content to or from information or updating the information, but is not limited thereto.

Figure 2A:
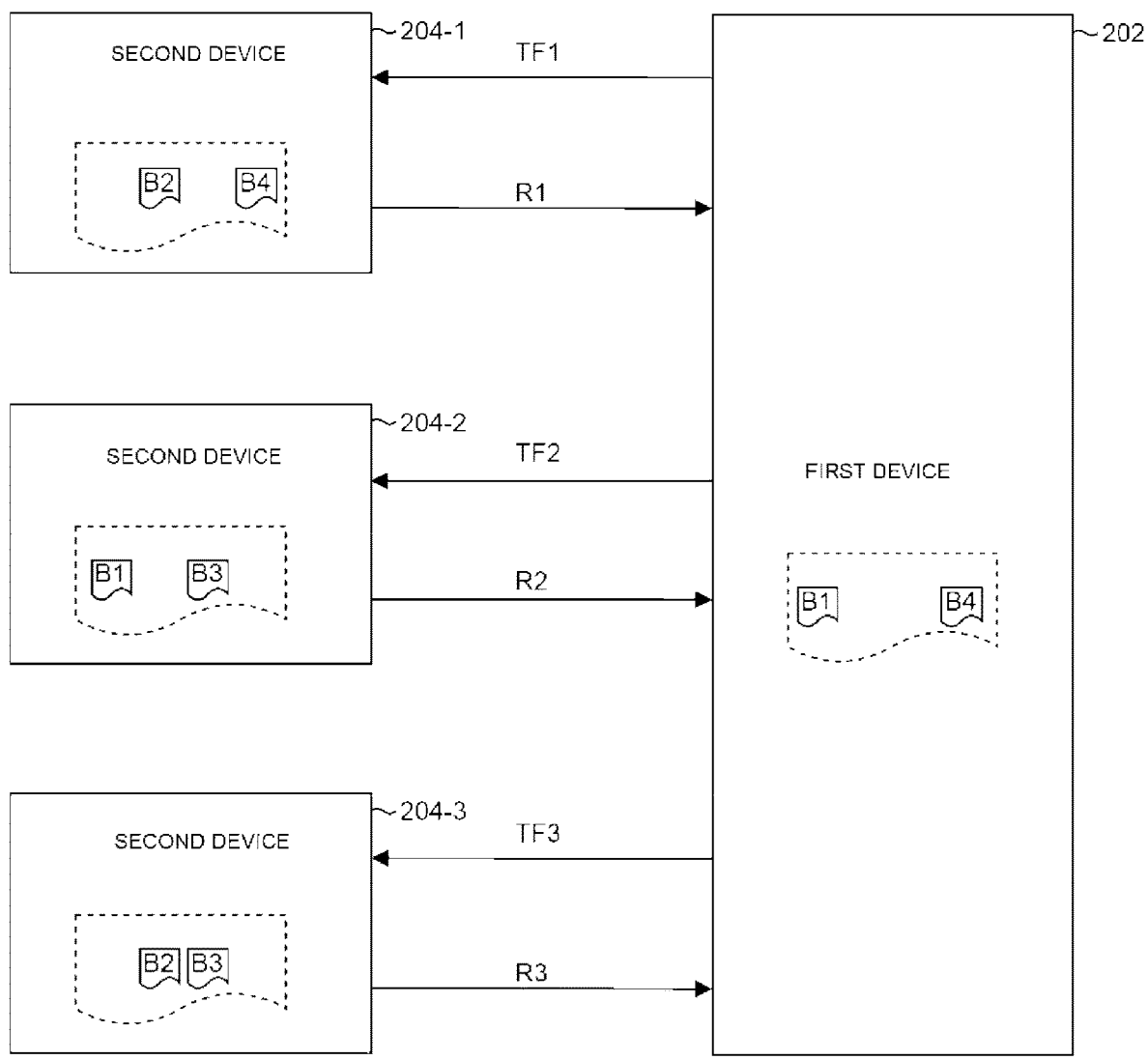
FIG. 2A shows a system according to an embodiment.

FIG. 2A shows a system according to an embodiment.

According to an embodiment, the system may consist of only a user's devices without a server. Thus, such a server-free system may operate both when connected to a server and when not connected to the server. According to an embodiment, the server-free system may be a block-chain-based IoT system for server-free data management in a block-chain-based IoT ecosystem.

In an embodiment, the server-free system may distribute data regarding a specific device to other devices as well. Data is distributed to devices in a network. The sum of distributed data may form a blockchain. For example, when block 1, block 2, and block 3 are respectively stored in device 1, device 2, and device 3, respectively, block 1, block 2, and block 3 may form a blockchain. The sum of distributed data excluding duplicate data may form a blockchain. For example, when block 1 and block 2 are stored in device 1, block 2 and block 3 are stored in device 2, and block 3 and block 1 are stored in device 3, block 1, block 2, and block 3 may form a blockchain.

In an embodiment, a first device 202 and second devices 204-1, 204-2, and 204-3 may store data blocks. The data blocks stored in the first device 202 and the second devices 204-1, 204-2, and 204-3 may be different from one another. Examples of the first device 202 and the second devices 204-1, 204-2, and 204-3 may include, but are not limited to, air-conditioners (ACs), refrigerators, medical devices, industrial IoT devices, thermostats, vehicles, in-vehicle infotainment systems, mobile devices, TVs, smartphones, tablets, wearable devices, smartwatches, smart bands, smart glasses, speakers, heaters, radiators, shower devices, light bulbs, robot vacuum cleaners, electric curtains, doorbells, video doorbells, cameras, surveillance cameras, personal computers (PCs), laptop computers, micro servers, IoT hubs, various sensors, etc.

In an embodiment, after data corresponding to the first device 202, e.g., data generated by the first device 202, is stored in another device in a network, the first device 202 may request retrieval of the data from the other device. In an embodiment, the first device 202 may transmit transaction fragments (TFs) to request data from the second devices 204-1, 204-2, and 204-3. Referring to FIG. 2A, the first device 202 may respectively transmit transaction fragments TF1, TF2, and TF3 to the second devices 204-1, 204-2, and 204-3, and the second devices 204-1, 204-2, and 204-3 may respectively return results R1, R2, and R3 to the first device 202 in response to the transaction fragments TF1, TF2, and TF3.

In the present disclosure, a device requesting retrieval may be referred to as a requesting device. The terms "first device" and "requesting device" are hereinafter used interchangeably and refer to the first device 202, but the second devices 204-1, 204-2, and 204-3 may also function as a requesting device.

In an embodiment, data corresponding to a first device may be distributed to other devices and be included in a blockchain. In other words, the data may form a blockchain as a block.

In an embodiment, the first device 202 may request a record of temperatures during the past month.

For convenience of description, devices in the network, other than the first device 202 that is the requesting device 202, may be referred to as the second devices 204-1, 204-2, and 204-3. The requesting device 202 may enter into a contractual agreement with one or more second devices 204-1, 204-2, and 204-3 in the network, and in accordance with the contractual agreement, data corresponding to the requesting device 202 may be distributed and stored in the one or more second devices 204-1, 204-2, and 204-3.

In an embodiment, the first device 202 and the one or more second devices 204-1, 204-2, and 204-3 may allocate areas of their respective memories in which to store data corresponding to the first device 202. In other words, each device may use a part of its memory capacity for another device. The terms "data" and "data block" are used interchangeably.

Figure 2B:
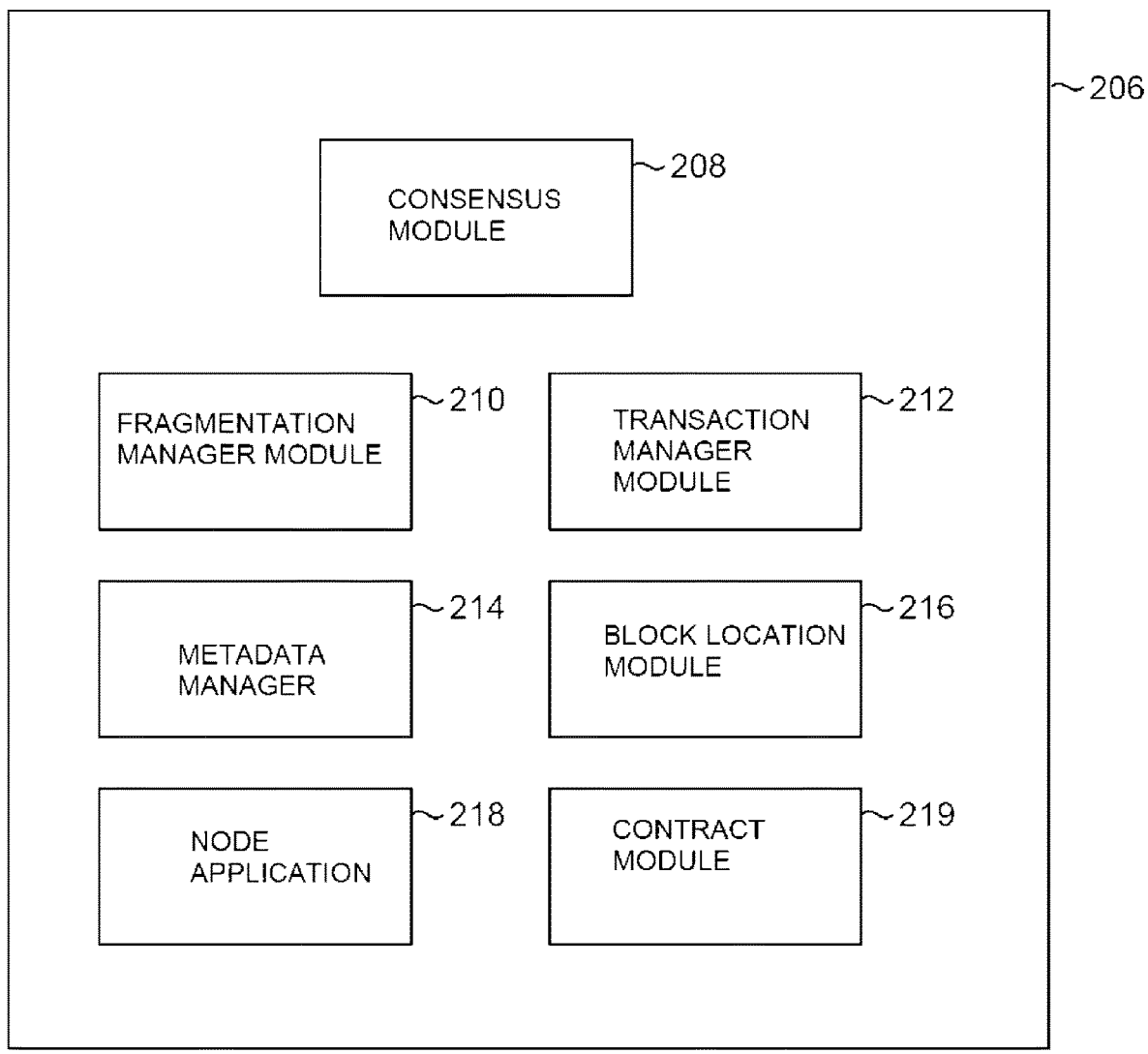
FIG. 2B is a block diagram of a device according to an embodiment.

FIG. 2B is a block diagram of a device according to an embodiment.

According to one embodiment, each of the first device 202 and the second devices 204-1, 204-2, and 204-3 may include a blockchain module 206 for performing operations according to embodiments of the present disclosure. In the present disclosure, the blockchain module 206 may be referred to as a fragmented blockchain (or BC) stack 206.

According to embodiments, the device may include more or fewer units than those described above. Because units of the device are only individually named in order to distinctively describe operations performed by the device, it should not be understood that a specific operation performed by the device is necessarily performed by a specific unit. For example, an operation described as being performed by a specific unit of the device may be performed by another unit, an operation described as being performed by one unit of the device may be performed by a plurality of units, and an operation described as being performed using interactive processing among a plurality of units of the device may be performed by one unit. Furthermore, an operation described as being performed by the device may be performed by another device or with the help of the other device. The device may include a memory and a processor. Software units of the device, such as program modules, may be stored in the memory as a set of instructions, and the instructions may be executed by the processor to perform corresponding functions.

Each of the first device 202 and the one or more second devices 204-1, 204-2, and 204-3 may include the fragmented BC stack 206. The fragmented BC stack 206 may be stored in a memory of each of the nodes, i.e., the first device 202 and the second devices 204-1, 204-2, and 204-3 and be executed by a processor of each node. Furthermore, the fragmented BC stack 206 may be part of firmware for each node. The fragmented BC stack 206 may include a consensus module 208, a fragmentation manager module 210, a transaction manager module 212, a metadata manager 214, a location manager 216, a node application 218, and a contract module 219. The requesting device 202 may include a transaction master for initiating a transaction. The number of subunits of each unit may be greater than or less than that described in the present disclosure. Because subunits of each unit are individually named in order to distinctively describe operations performed by the unit, it should not be understood that a specific operation performed by the unit is necessarily performed by a specific subunit. For example, an operation described as being performed by a specific subunit may be performed by another subunit, an operation described as being performed by one subunit may be performed by a plurality of subunits, and an operation described as being performed using interactive processing among a plurality of subunits may be performed by one subunit. Furthermore, an operation described as being performed by a specific unit may be performed by another unit or with the help of the other unit. A unit and its subunits may have a hierarchical relationship between them, but since subunits of each unit are only individually named in order to distinctively describe operations performed by the corresponding unit, the unit and its subunits may not have a hierarchical relationship therebetween.

In an embodiment, the first device 202 may enter into a contractual agreement with the one or more second devices 204-1, 204-2, and 204-3, and thus, data corresponding to the first device 202 may be distributed to the one or more second devices 204-1, 204-2, and 204-3 as well as the first device 202. The contract module 219 of each of the first device 202 and the second devices 204-1, 204-2, and 204-3 may store details of the contractual agreement. In an embodiment, the metadata manager 214 may store metadata corresponding to all data in the network. Furthermore, the location manager 216 may store information about where each data block is to be located in a blockchain. In an embodiment, the metadata manager 214 and the location manager 216 are updated when data is added to a node that has entered into a contract within the network. In an embodiment, all data that is fragmented and then distributed to the first device 202 and the one or more second devices 204-1, 204-2, and 204-3 forms the blockchain. In an embodiment, the first device 202 and the one or more second devices 204-1, 204-2, and 204-3 store metadata information and location information of data blocks distributed across the network. Furthermore, a user may configure the requesting device 202 so that data blocks may be copied onto the first device 202 and each of the second devices 204-1, 204-2, and 204-3 based on a replication factor. The replication factor may be set by the user, but is not limited thereto. The replication factor may be determined to be an appropriate number based on capabilities of the network or node. The capabilities of the network or node may be about a network bandwidth, a central processing unit (CPU), memory, etc. When the replication factor is 3, the same blocks may be stored at three locations.

The higher the replication factor, the higher the data availability offered by the blockchain network. The replication factor may be set via a mobile phone application used by the user to control and monitor the blockchain network.

The first device 202 and the one or more second devices 204-1, 204-2, and 204-3 may be referred to as nodes in a blockchain-based IoT system, and thus, the nodes are used interchangeably with the first device 202 and the one or more second devices 204-1, 204-2, and 204-3. One or more of the nodes 202, 204-1, 204-2, and 204-3 may include a memory and a processor coupled to the memory. Furthermore, the one or more of the nodes 202, 204-1, 204-2, and 204-3 may include firmware.

For example, the user may have the node application 218 installed on the user's device and change settings through the node application 218. For example, the above-described replication factor may be set. Thus, fragmented blocks of the blockchain may be stored in the nodes 202, 204-1, 204-2, and 204-3 based on a plurality of factors such as user preferences, storage capacity of nodes 202, 204-1, 204-2, and 204-3, a user bandwidth, a bandwidth available to the nodes 202, 204-1, 204-2, and 204-3, a proximity between the nodes 202, 204-1, 204-2, and 204-3, the user, etc.

In an embodiment, data regarding older blockchain transactions may be distributed across all the nodes 202, 204-1, 204-2, and 204-3. Distribution of fragmented blocks of the blockchain may be based on contractual agreements among the nodes 202, 204-1, 204-2, and 204-3. A contractual agreement may be stored in each of the nodes 202, 204-1, 204-2, and 204-3, i.e., the contract module 219 within the fragmented BC stack 206. The contractual agreement defines a set of devices where a device can store its data. The first device 202 may enter into a contract with the one or more second devices 204-1, 204-2, and 204-3, and accordingly, all data corresponding to the first device 202 may be stored in the one or more second devices 204-1, 204-2, and 204-3.

In an embodiment, when a transaction is initiated by the requesting device 202, a transaction master of the requesting device 202 may retrieve metadata and a location corresponding to a requested block. The requesting device 202 may be any of the devices in the network. In an embodiment, a transaction may be an interaction between a user of the requesting device 202 and at least one of the one or more second devices 204-1, 204-2, and 204-3 in the network. For example, the transaction may be a record of temperatures corresponding to an air conditioner over the past month. As another example, the transaction initiated by the requesting device 202 may be a transaction for collecting a user's medical history from IoT health sensors. In an embodiment, the fragmentation manager module 210 fragments, based on obtained metadata information, the transaction into a plurality of transaction fragments. For example, a record of air conditioner temperatures may be fragment into partial records for the first ten days, for the next ten days, and for the last ten days. The record for the first ten days may be stored in a refrigerator, the record for the next ten days in a hub, and the record for the last ten days in a TV. Thus, the fragmentation manager module 210 fragments the transaction into 3 transaction fragments based on metadata information regarding air conditioner temperature data stored in the refrigerator, the hub, and the TV.

In an embodiment, the requesting device 202 transmits a plurality of transaction fragments to devices including respective pieces of data. For example, a first transaction fragment corresponding to air conditioner temperatures for the first ten days of the month may be transmitted to the refrigerator, a second transaction fragment corresponding to air conditioner temperatures for the next ten days may be transmitted to the hub, and a third transaction fragment corresponding to air conditioner temperatures for the last ten days may be transmitted to the TV.

In an embodiment, the requesting device 202 may use a consensus mechanism to identify a correct response received from the nodes 204-1, 204-2, and 204-3. The consensus module 208 is configured to perform a consensus mechanism. The consensus module 208 may include one or more consensus algorithms, such as a practical byzantine fault tolerance (PBFT) algorithm, a proof of work (PoW) algorithm, a proof of stake (PoS) algorithm, a delegated PoS algorithm, etc., but is not limited thereto, and various consensus algorithms may be used. In an embodiment, the consensus module 208 is configured so that a group of nodes decide a correct response, and the nodes may build and support the decision that is best for them. A consensus algorithm may help to achieve reliability in a network involving a plurality of distrusting nodes. In this case, the same data set is copied to two devices, and the consensus module 208 is configured to find a correct result. If the result is the same on the two devices, the result is provided to the requesting device 202. If the result is not the same, the consensus algorithm is rerun.

In an embodiment, a consensus may be determined by a majority, and the majority may be determined by the number of devices, wherein each device may be implemented to have a different voting power. For example, each device may have a different voting power based on capability and storage capacity of the device, a user's usage frequency, user preferences, etc.

In an embodiment, through distribution of data blocks across all devices within the network and fragmented transactions, data corresponding to a specific device is distributed throughout the entire network. Even if the network is not connected to a cloud, all transactions may take place within the network. Thus, when a specific device in the network is damaged, the data is kept intact. Furthermore, a single device such as a master device does not need to be used to store a complete blockchain.

Figure 3:
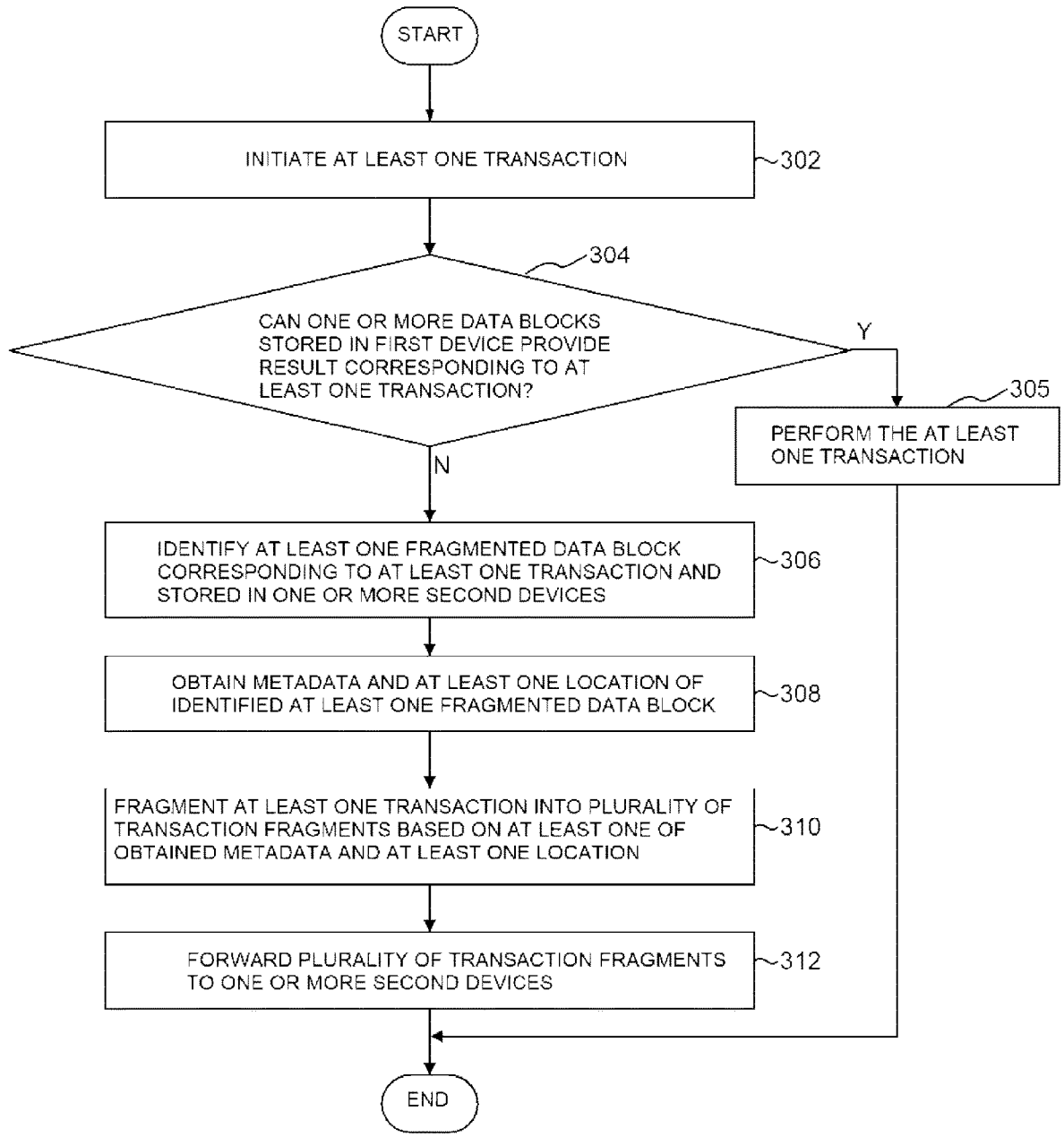
FIG. 3 is a flowchart of a method of managing a transaction according to an embodiment.

FIG. 3 is a flowchart of a method of managing a transaction according to an embodiment.

The method may be a server-free method for managing a transaction in a blockchain-based IoT environment. In an embodiment, the first device 202 and the second devices 204-1, 204-2, and 204-3 respectively allocate areas of corresponding memories in which to store data blocks in the blockchain. A size of an allocated area in a memory may be predetermined or adjusted appropriately. The size of the allocated area in the memory may vary according to the specifications of devices such as memory capacity. Each of the nodes 202, 204-1, 204-2, and 204-3 is considered equivalent because data blocks are distributed throughout the entire network. Based on a contractual agreement, each of the nodes 202, 204-1, 204-2, and 204-3 may be mutually associated with a plurality of transactions within the network.

In operation 302, the first device 202 initiates at least one transaction. In an embodiment, the transaction may be an interaction between the first device 202 and the one or more second devices for extracting IoT device related information.

In operation 304, the first device 202 determines whether one or more data blocks stored in the first device 202 can provide a result corresponding to the at least one transaction. When it is determined in operation 304 that the one or more data blocks are able to provide the corresponding result, in operation 305, the first device 202 performs the at least one transaction and output a result based on the data block stored in the first device 202.

When it is determined that the one or more data blocks stored in the first device 202 are unable to provide the result corresponding to the at least one transaction, in operation 306, the first device 202 identifies at least one fragmented data block corresponding to the at least one transaction and stored in the one or more second devices 204-1, 204-2, and 204-3. In an embodiment, the at least one fragmented data block may be stored in the one or more second devices 204-1, 204-2, and 204-3 based on a contractual agreement between the first device 202 and the one or more second devices 204-1, 204-2, and 204-3.

In operation 308, the first device retrieves at least one location of the at least one fragmented data block from metadata and the one or more second devices 204-1, 204-2, and 204-3. In an embodiment, the metadata is backed up on at least one of the first device 202, the one or more second devices 204-1, 204-2, and 204-3, and a cloud.

In operation 310, the first device 202 performs fragmentation by splitting the at least one transaction into a plurality of transaction fragments based on one or more of the metadata and the at least one location of the at least one fragmented data block.

In operation 312, the first device 202 transmits the plurality of transaction fragments to the one or more second devices 204-1, 204-2, and 204-3. In an embodiment, transmitting the plurality of transaction fragments to the one or more second devices 204-1, 204-2, and 204-3 includes transmitting the transaction fragments to at least two of the one or more second devices 204-1, 204-2, and 204-3 when the first device 202 determines that at least one fragmented data block held by the at least two second devices is identical to each other. In an embodiment, after receiving the plurality of transaction fragments, the one or more second devices 204-1, 204-2, and 204-3 execute the plurality of transaction fragments and provide results of executing the transaction fragments back to the first device 202. When the transaction fragments are transmitted to the one or more second devices 204-1, 204-2, and 204-3, the first device 202 evaluates, based on a consensus mechanism, the results of executing the transaction fragments, which are provided by the one or more second devices 204-1, 204-2, and 204-3.

Figure 4:
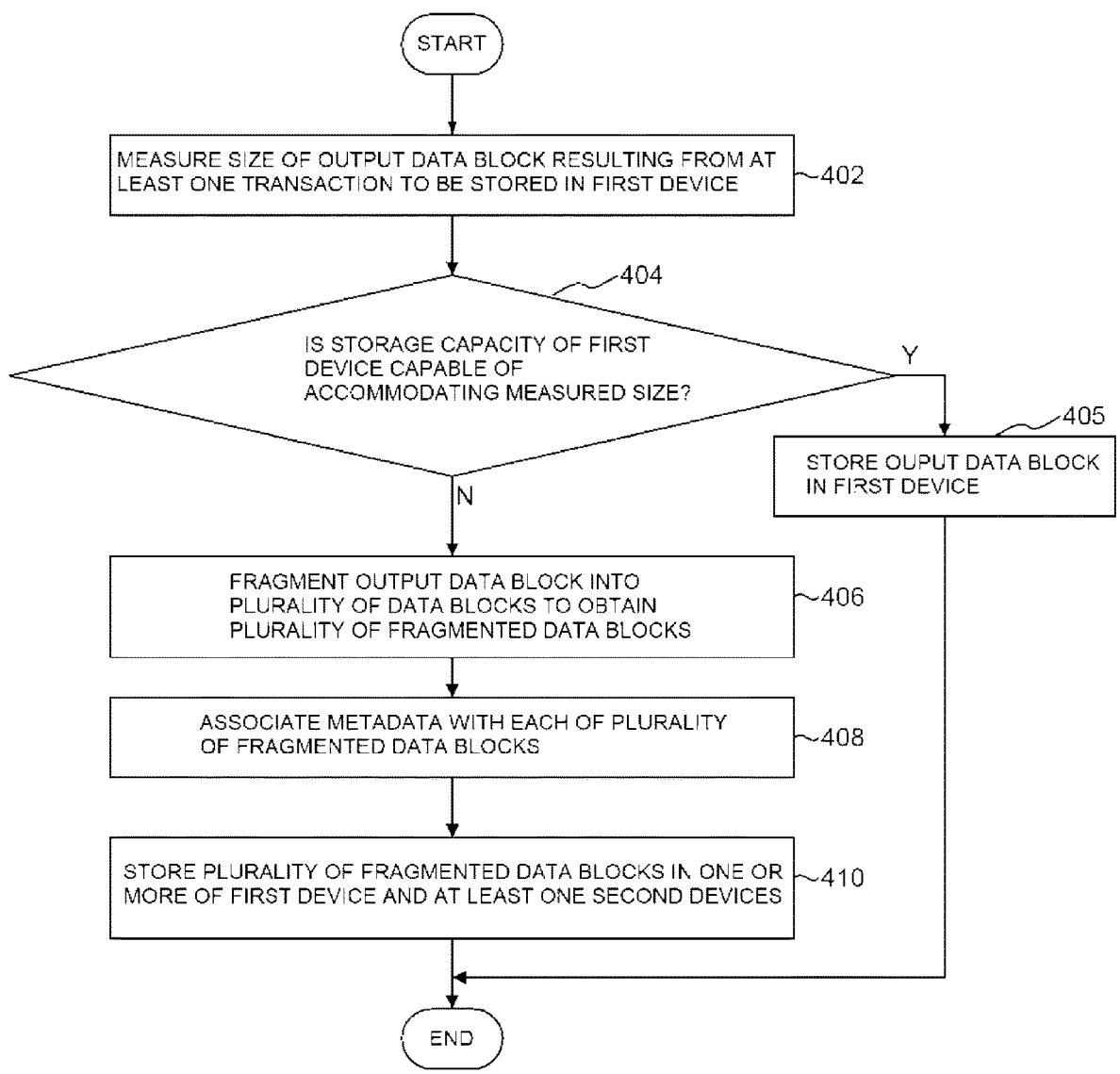
FIG. 4 is a flowchart of a method of storing a data block according to an embodiment.

FIG. 4 is a flowchart of a method of storing a data block according to an embodiment.

This method may be a server-free method for managing data in a blockchain-based IoT ecosystem. The method may be performed after the first device 202 obtains results of initiating at least one transaction, but is not limited thereto. For example, the method may have already been performed before the first device 202 initiates a transaction.

In operation 402, the first device 202 measures a size of an output blockchain data block resulting from at least one transaction on the blockchain to be stored in the first device 202.

In operation 404, the first device 202 detects whether its storage capacity is not large enough to accommodate the measured size of the output blockchain data block. When the first device 202 detects, in operation 404, that the storage capacity is large enough to accommodate the output data block, the first device 202 may store the output data block therein in operation 405.

In operation 406, the first device 202 fragments the measured output blockchain data block into a plurality of data blocks in order to obtain a plurality of fragmented data blocks.

In operation 408, the first device 202 associates metadata with each of the plurality of fragmented data blocks. The first device 202 may retrieve, based on the association of the metadata, a plurality of fragmented data blocks from the one or more second devices 204-1, 204-2, and 204-3.

In operation 410, the first device 202 stores the plurality of fragmented data blocks in at least one of the first device 202 and the one or more second devices 204-1, 204-2, and 204-3. The plurality of fragmented data blocks may be stored based on storage capacity of the first device 202 and one or more second devices 204-1, 204-2, and 204-3. At least one fragmented data block may be copied onto the first device 202 and the one or more second devices 204-1, 204-2, and 204-3, based on a replication factor set by the user. A replication factor may be configured based on the storage capacity of a device.

Figure 5:
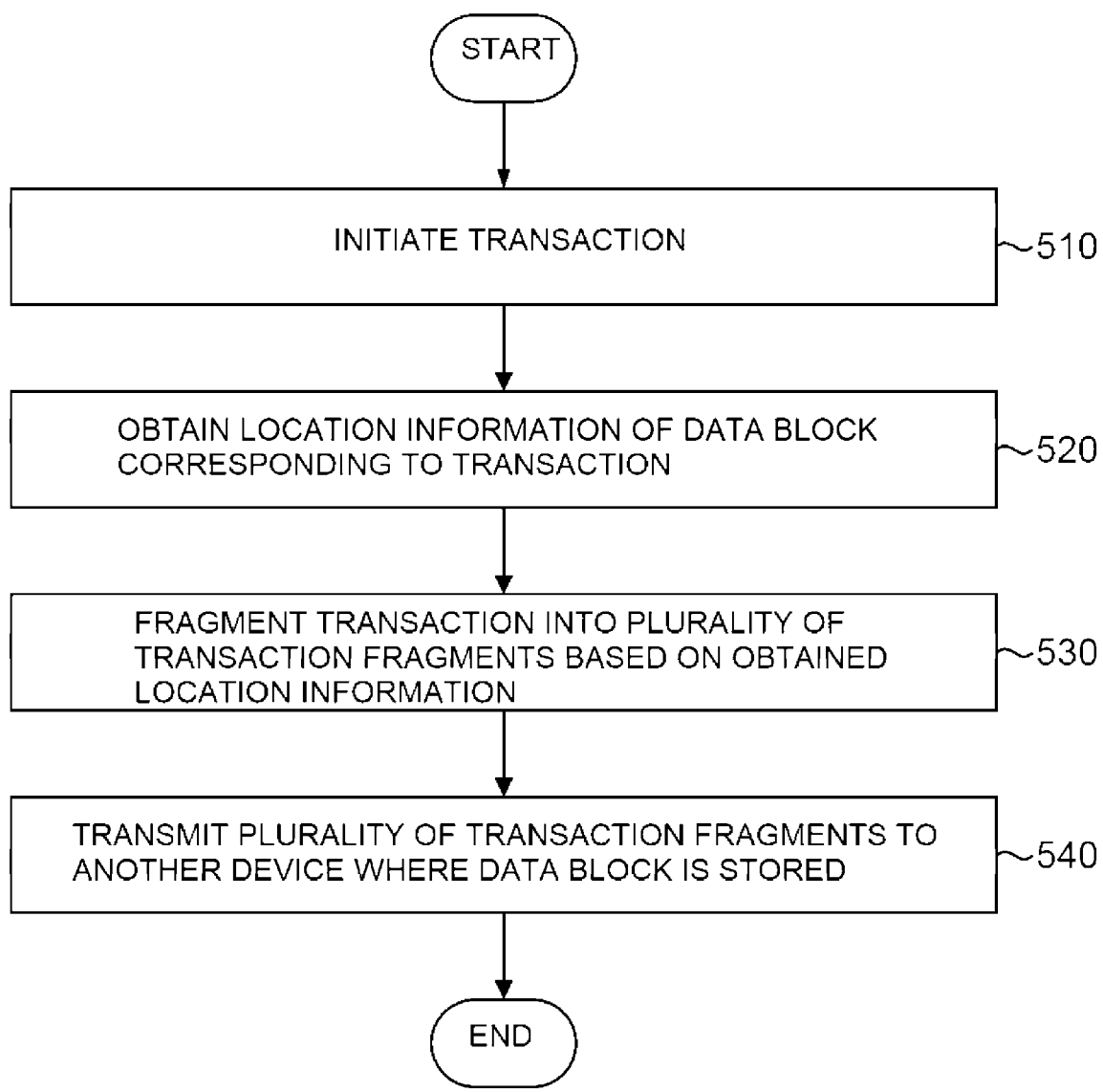
FIG. 5 is a flowchart of a method performed by a first device, according to an embodiment.

FIG. 5 is a flowchart of a method performed by a first device, according to an embodiment.

In operation 510, a transaction may be initiated. The transaction may be initiated by a requesting device, for example, the first device described above, but is not limited thereto, and may be initiated by a device corresponding to a node in a network. In this case, the transaction may refer to an act of adding or deleting content to or from information or updating the information, but is not limited thereto.

In operation 520, location information of a data block corresponding to the transaction may be obtained. The location information of the data block may be obtained from a device that initiated the transaction. Thus, the location information may be obtained from the first device. Location information of a block may be included in metadata of the block. The location information of the block is stored in all devices corresponding to nodes in the network and may be obtained at any time by a device initiating the transaction. The location information of the block indicates on which node in the network the block is stored, and a device that has obtained the location information may perform, when the block is stored in the device itself, the transaction based on the data stored therein. When a necessary block is stored in another device, the transaction may be transmitted to the other device in order to request the other device for a result of performing the transaction based on the block. When necessary blocks are stored in several devices, the transaction may be fragmented in order to request the several devices for results of performing the transaction based on the blocks.

Referring to FIG. 2A, the requesting device 202 may be in communication with the second devices 204-1, 204-2, and 204-3, and a blockchain including data related to nodes 202, 204-1, 204-2, and 204-3 in the network may be fragmented into blocks B1, B2, B3, and B4. That is, blocks B1 and B4 are stored in the first device 202, blocks B2 and B4 are stored in the second device 204-1, blocks B1 and B3 are stored in the second device 204-2, and blocks B2 and B3 may be stored in the second device 204-3. In the case of a fragmented blockchain, each node is equivalent and may be associated with multiple transactions.

In operation 530, the transaction may be fragmented into a plurality of transaction fragments, based on the obtained location information. In other words, when necessary blocks are stored in several devices, the transaction may be fragmented in order to request the several devices for results of performing the transaction based on the blocks.

In operation 540, the plurality of transaction fragments may be transmitted to another device where the data block is stored. A device that has received a transaction fragment may return a result of performing the transaction fragment to the device that initiated the transaction.

FIG. 6A shows a use case example according to an embodiment.

Figure 6B:
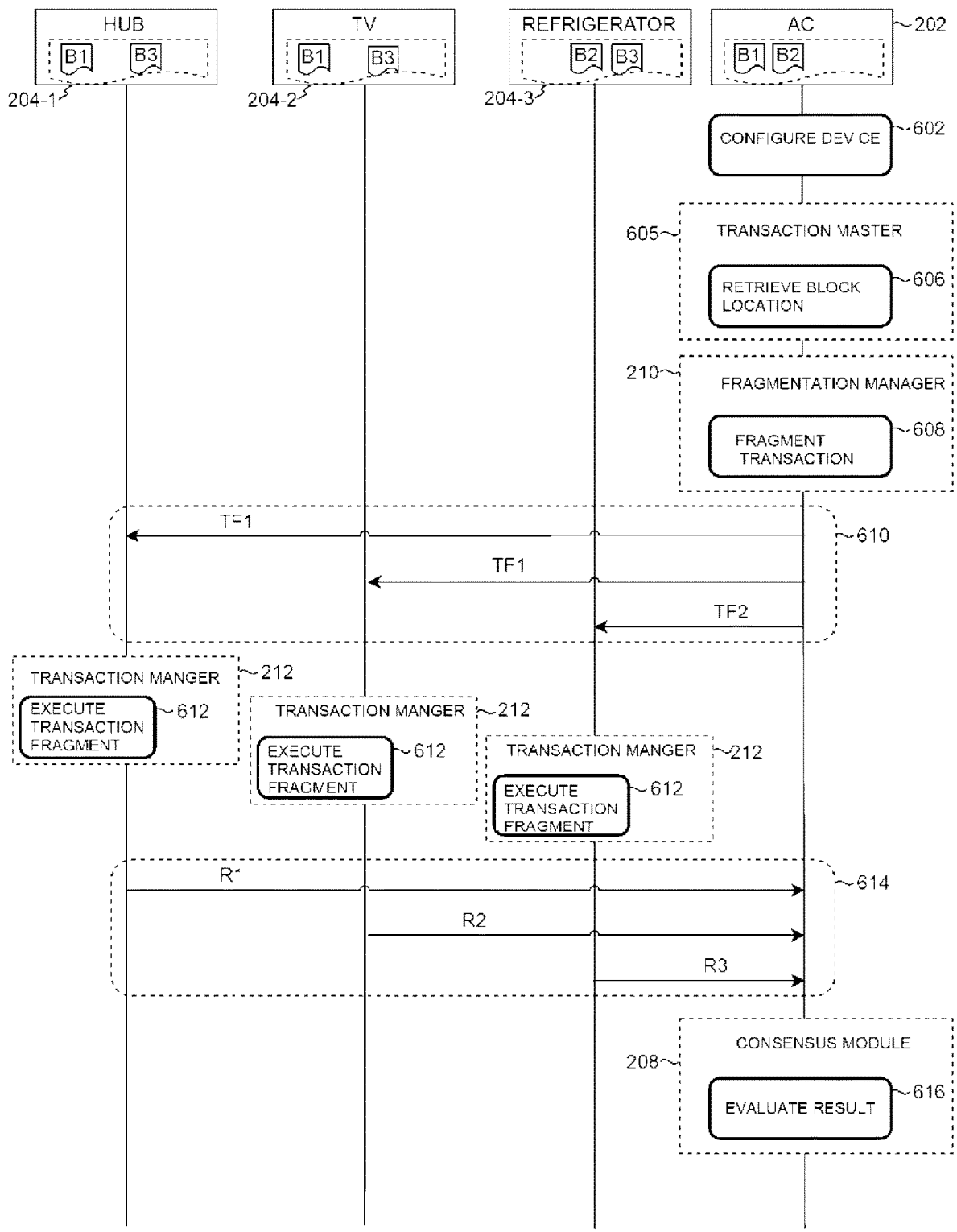
FIG. 6B is a flowchart for explaining FIG. 6A.

FIG. 6B is a flowchart for explaining FIG. 6A.

In the use case example, an air conditioner (AC) may have a contract with second devices 204-1, 204-2, and 204-3 and may be a requesting device 202 that stores data blocks including event information related to the AC in the second devices 204-1, 204-2, and 204-3. In the use case example, the second devices 204-1, 204-2, and 204-3 are a hub (FHub), a smart TV, and a refrigerator, respectively.

In operation 602, the AC may be configured to predict a user's preferred setting based on current room conditions.

In operation 604, the requesting device 202, i.e., the AC, initiates a transaction master 605 thereon. In the present disclosure, the transaction master 605 may refer to a transaction manager module 212 for initiating a transaction. The AC may initiate, via the transaction master 605, a transaction for predicting the user's preferred setting.

In operation 606, the transaction master 605 of the AC may retrieve a location of a requested block via the location manager 216. In other words, locations of necessary blocks necessary to predict the user's preferred setting may be retrieved. Locations of blocks may also be retrieved via the metadata manager 214. Various data blocks including AC event information may be stored in the second devices 204-1, 204-2, and 204-3, i.e., the hub, the smart TV, and the refrigerator. The transaction may be, for example, fetching temperature and mode values most frequently used by the user. A user's preferred temperature may be determined based on the corresponding temperature and mode values.

In operation 608, the AC splits, via a fragmentation manager module 210, the transaction into a plurality of transaction fragments TF1 and TF2 based on locations of requested blocks.

In operation 610, the requesting device 202 transmits the transaction fragments TF1 and TF2 to the second devices 204-1, 204-2, and 204-3 holding requested data blocks, i.e., the hub, the smart TV, and the refrigerator. When at least one of the hub, the smart TV, and the refrigerator holds the same data block, for example, when the hub and the smart TV each hold the same data blocks B1 and B3, the requesting device 202 transmits a transaction fragment to one or more devices holding the same data blocks. In this case, the same transaction fragment may be transmitted to the hub and the smart TV.

In operation 612, each of the hub, the smart TV, and the refrigerator initiates the transaction manager module 212 to execute a transaction fragment.

In operation 614, the hub, the smart TV, and the refrigerator return, to the AC, responses to a request from the AC, i.e., results R1, R2, and R3 obtained by executing transaction fragments.

In operation 616, the requesting device 202 executes the consensus module 208 to evaluate the responses of the hub, smart TV and refrigerator. When two or more devices have been assigned the same transaction fragment, the consensus module 208 decides which of the two results to select. When results are the same on the second devices that have been assigned the same transaction fragment, the result may be displayed. Otherwise, the process may be rerun but may be implemented to always yield a result, even when their results are not the same, depending on a consensus algorithm.

In an embodiment, the requesting device 202 compiles all the results to generate a result of the transaction. The result of the transaction may be provided to the user via a user interface.

Figure 7A:
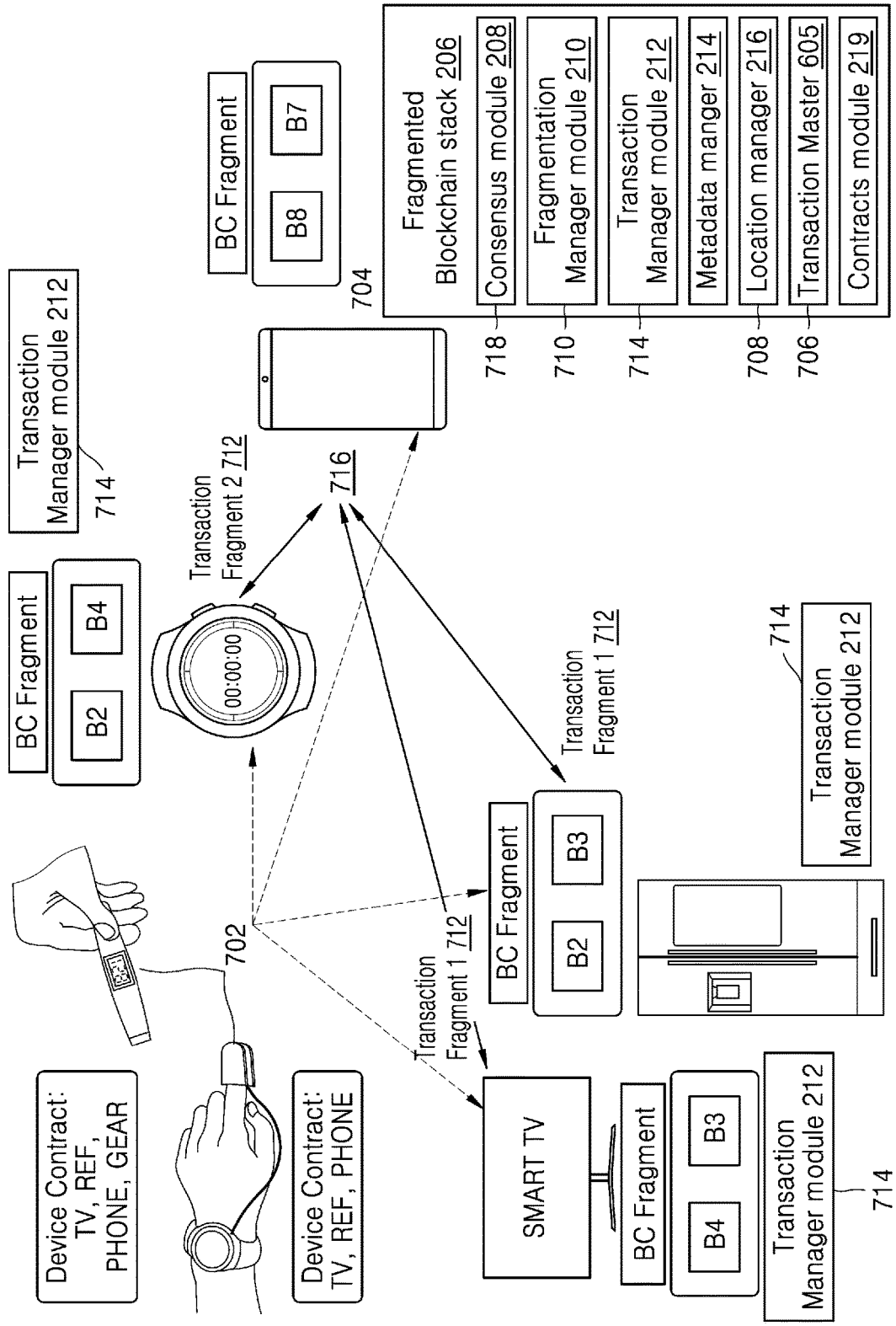
FIG. 7A shows a use case example according to an embodiment.

FIG. 7A shows a use case example according to an embodiment.

Figure 7B:
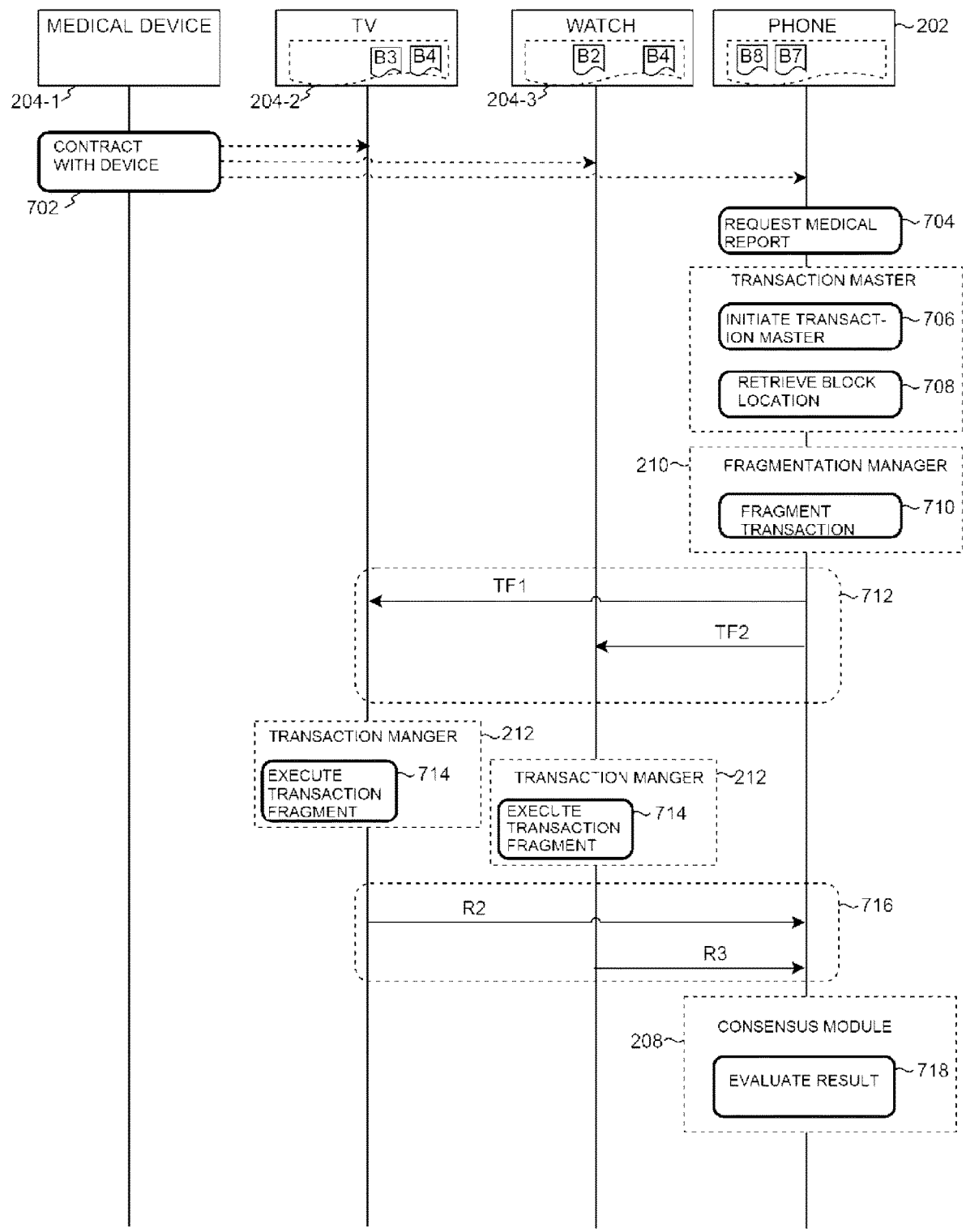
FIG. 7B is a flowchart for explaining FIG. 7A.

FIG. 7B is a flowchart for explaining FIG. 7A.

In operation 702, medical devices 204-1, e.g., a thermometer, which have a contract with other nodes 202, 204-2, and 204-3 in a network, store data blocks related to their use and measurement in the other nodes 202, 204-2, and 204-3. In accordance with the contract, data generated by the thermometer may be stored in the other nodes 202, 204-2, and 204-3. In an embodiment, different types of data may be distributed to each node. For example, temperature data measured and generated by the thermometer may be stored in the nodes 202 and 204-2, and humidity data and other types of data, except for the temperature data, which are measured and generated by the thermometer, may be stored in the nodes 204-2 and 204-3. Data distributed to each node may differ depending on the timing of measurement or generation of the data. For example, temperature data measured and generated in the morning by the thermometer may be stored in the nodes 202 and 204-2, and temperature data measured and generated in the afternoon by the thermometer may be stored in the nodes 204-2 and 204-3.

In operation 704, a medical report may be requested based on a user input. The request for the medical report may be made via a requesting device 202 that is a user's phone. The medical report may be generated based on a user's history from all medical devices but may be generated based on a history from a specific medical device.

In operation 706, the phone initiates a transaction master thereon. After initiation of the transaction master, at least one transaction may be initiated on the phone.

In operation 708, the phone may retrieve a location of a requested block via the location manager. The transaction master initiated on the phone may retrieve a location of a block via the location manager. A location of a block may also be retrieved via the metadata manager.

In operation 710, the phone may fragment, via the fragmentation manager module 210, the transaction into smaller fragments based on locations of requested blocks. For example, the transaction may be an act of fetching average values of temperatures and average values of blood oxygen saturation levels from second devices 204-2 and 204-3, and these values may have been measured by the medical devices 204-1 such as the thermometer and a blood oxygen saturation measurement device. For example, the other second devices 204-2 and 204-3 may be a TV and a smartwatch, respectively.

In operation 712, the requesting device 202 respectively transmits transaction fragments TF1 and TF2 to the TV and the smartwatch, each holding the requested data blocks. When data for a transaction exists in a plurality of nodes, transaction fragments are transmitted to all nodes with the requested data.

In operation 714, the second devices 204-2 and 204-3 that have respectively received the transaction fragments TF1 and TF2 execute the transaction fragments TF1 and TF2 via the transaction manager module 212.

In operation 716, the second devices 204-2 and 204-3 that have executed the transaction fragments TF1 and TF2 return execution results to the phone 202.

In operation 718, the requesting device 202, i.e., the phone, evaluates the received results via the consensus module 208. When two or more of the second devices 204-2 and 204-3 have been assigned the same transaction fragment, the consensus module 208 makes a decision about the results. When results are the same on the second devices that have been assigned the same transaction fragment, the result may be displayed. Otherwise, the process may be rerun but may be implemented to always yield any result, even when their results are not the same, according to a consensus algorithm.

Figure 8A:
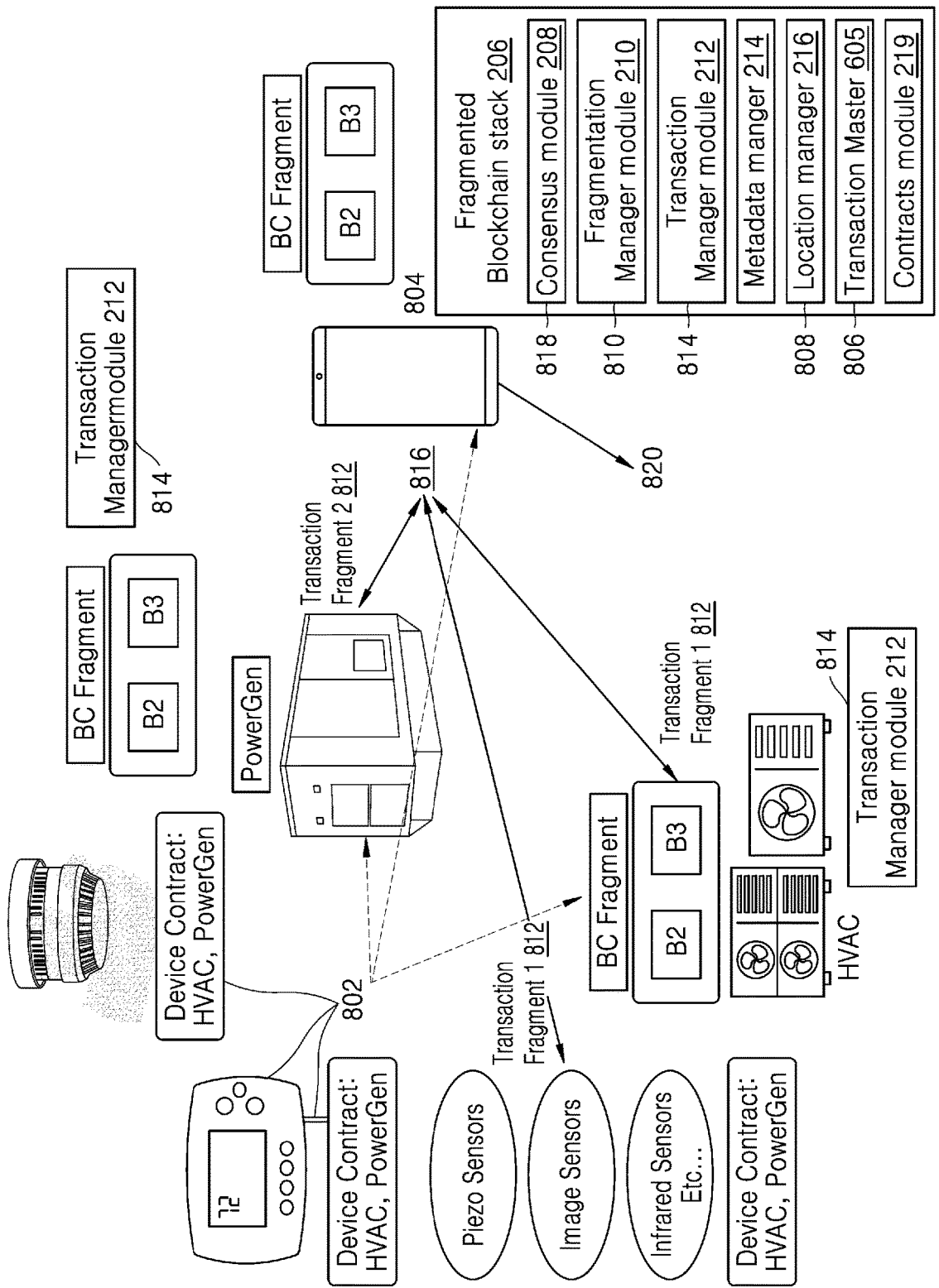
FIG. 8A shows a use case example according to an embodiment.

FIG. 8A shows a use case example according to an embodiment.

Figure 8B:
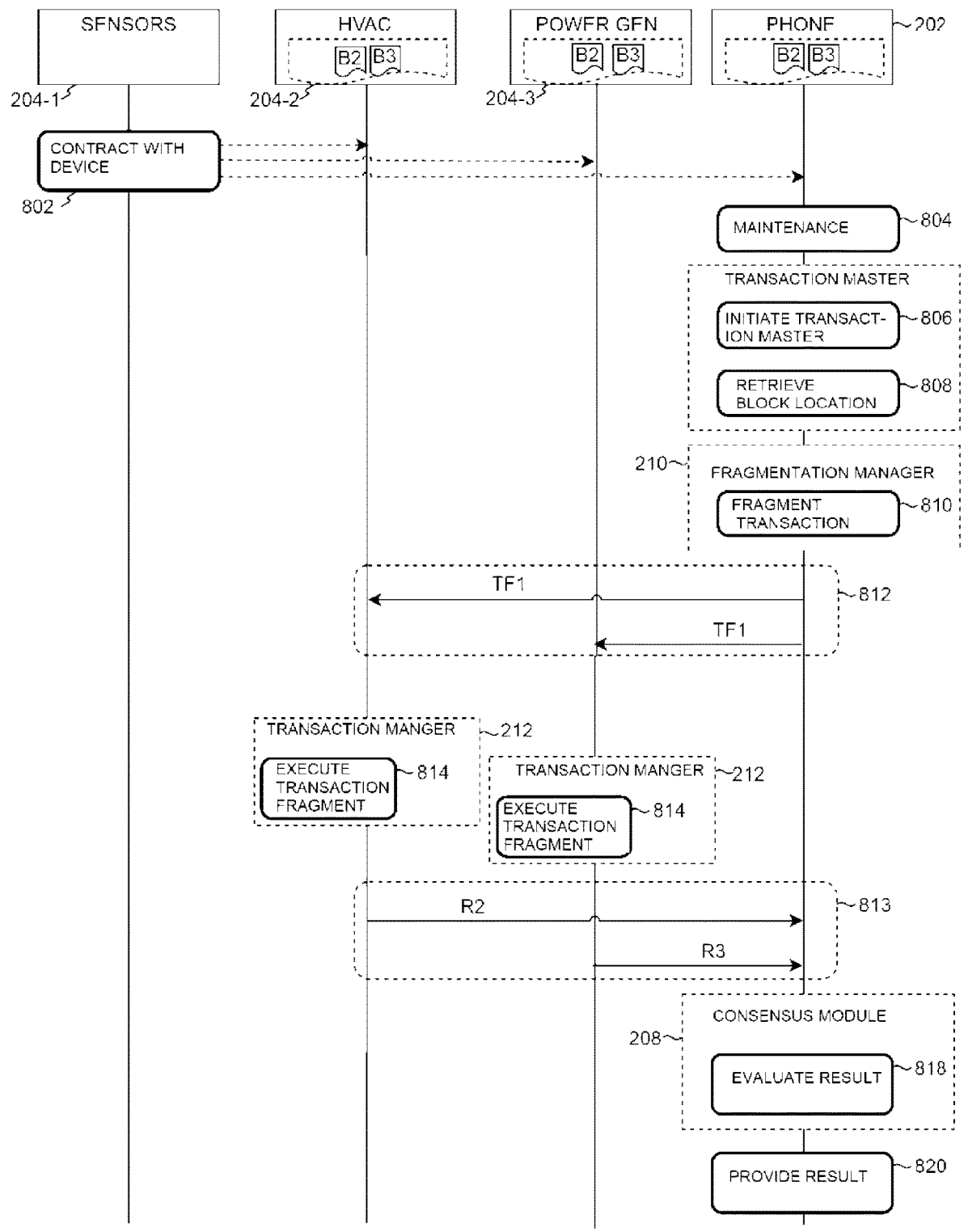
FIG. 8B is a flowchart for explaining FIG. 8A.

FIG. 8B is a flowchart for explaining FIG. 8A.

In operation 802, industrial IoT devices 204-1, e.g., a temperature sensor, a smoke sensor, a piezoelectric sensor, an image sensor, an infrared sensor, etc., may enter into contracts with other devices 204-2, 204-3, and 202 in a network, and data blocks from the industrial IoT devices 204-1 may be stored in nodes within the network, e.g., the other devices 204-2, 204-3, and 202, in accordance with the contracts.

In operation 804, predictive maintenance may be performed. For predictive maintenance, potential failures that may occur in industrial devices need to be predicted based on a device history or log. A requesting device 202 may be an administrator device, and the administrator device may be a phone. To predict failures associated with industrial devices, the history of the industrial devices may be used.

In operation 806, the administrator device initiates a transaction master thereon. After initiation of the transaction master, at least one transaction may be initiated on the administrator device. In order to obtain historical information of the industrial devices, a transaction may be initiated.

In operation 808, the administrator device may find a location of a requested block via the location manager. A location of a block may be retrieved from the metadata manager.

In operation 810, the administrator device fragments, via the fragmentation manager module 210, the transaction into smaller fragments based on locations of requested blocks. For example, the transaction may be an act of fetching average records of the temperature sensor and smoke sensor from second devices 204-2 and 204-3 that are a heating, ventilation, and air conditioning (HVAC) system and a power generator, respectively. Measurements of the temperature sensor and smoke sensor may have been stored in the HVAC system and the power generator in accordance with the contracts.

In operation 812, the administrator device transmits transaction fragments TF1 to the second devices 204-2 and 204-3 to execute the transaction fragments TF1.

In operation 814, the second devices 204-2 and 204-3 execute the transaction fragments TF1 via the transaction manager module 212.

In operation 816, the second devices 204-2 and 204-3 may transmit results R2 and R3 of executing the transaction fragments TF1 to the administrator device.

In operation 818, the administrator device evaluates the results R2 and R3 from the HVAC and the power generator via the consensus module 208. When two or more devices have been assigned the same transaction fragment, the consensus module 208 makes a decision about results. When results are the same on the second devices that have been assigned the same transaction fragment, the result may be displayed. Otherwise, the process may be rerun but may be implemented to always yield any result regardless of whether the results are the same or different according to a consensus algorithm.

In operation 820, the administrator device compiles all results to generate a result of the transaction. The result of the transaction may be provided to the user via a user interface.

Various operations of a method described according to an embodiment may be performed in the order specified, in a different order, or simultaneously. Furthermore, some operations included in the method may be omitted in some embodiments.

Because device information belonging to users may be stored locally, embodiments provide enhanced security. Since all devices in the network may be untrusted and consensus is achieved on every transaction, embodiments provide additional security. Even if an IoT ecosystem is not connected to a cloud, embodiments may allow transactions to be performed.

Embodiments may be described in terms of functional block components and various processing steps. Such functional blocks may be implemented by any number of hardware and/or software components configured to perform particular functions. For example, the embodiments may employ integrated circuit components, such as memory, processing elements, logic elements, look-up tables, etc., which may execute a variety of functions under the control of one or more microprocessors or other control devices. Similarly to where components are implemented using software programming or software elements, the embodiments may be implemented by any programming or scripting language such as C, C++, Java, assembler, etc., with the various algorithms implemented with any combination of data structures, processes, routines or other programming elements. Functional aspects may be implemented by algorithms that are executed in one or more processors. Furthermore, the embodiments may employ conventional techniques for electronic environment setting, signal processing and/or data processing. Terms such as 'mechanism', 'element', 'means', and 'configuration may be used in a broad sense and are not limited to mechanical or physical components. The terms may include the meaning of a series of software routines in conjunction with processors, etc.

The embodiments are not intended to limit the scope of the present disclosure in any way. For the sake of brevity of the specification, conventional electronic configurations, control systems, software, other functional aspects of the systems may be omitted. Furthermore, connection lines or connection members shown in the figures represent exemplary functional connections and/or physical or logical connections between the elements, and may be presented as various alternative or additional functional connections, physical connections, or logical connections in an actual apparatus. In addition, no element may be essential in the embodiments unless the element is specifically described as "essential," "crucial," etc.

The use of the term "the" and similar referents in the present disclosure, in particular, in the following claims are to be construed to cover both singular and the plural. Furthermore, in an embodiment where a range is described, recitation of the range may be understood as including the application of separate values falling within the range (unless there is a particular description contrary thereto) as if each separate value within the range were individually recited herein. Finally, operations of a method according to an embodiment may be performed in an appropriate order unless otherwise specified herein or otherwise clearly contradicted by context. The embodiments are not necessarily limited by the order in which the operations are described. The use of any and all examples, or exemplary language (e.g., "such as", etc.) provided herein is intended to describe the embodiments in detail and does not pose a limitation on the scope of the present disclosure unless otherwise limited by the claims. It will also be understood by those of ordinary skill in the art that various changes, combinations, and modifications may be made therein according to design conditions and factors without departing from the accompanying claims and their equivalents.

The invention claimed is:

1. A device comprising:
a memory storing instructions; and
a processor configured to execute the instructions to:
initiate a transaction,
obtain location information of at least one data block of a plurality of data blocks corresponding to the transaction, the location information indicating on which node in a blockchain network the at least one data block is stored,
perform fragmentation by splitting the transaction into a plurality of transaction fragments based on the location information, and
transmit the plurality of transaction fragments to other devices where the at least one data block is stored,
wherein the location information of the at least one block is stored in all devices corresponding to nodes in the blockchain network and is obtained by the device initiating the transaction.

2. The device of claim 1, wherein the transaction includes an interaction between a plurality of devices including the device and the other devices.

3. The device of claim 1, wherein the transaction is related to an operation history of one of a plurality of devices including the device and the other devices.

4. The device of claim 1, wherein the memory includes an area allocated for storing a data block.

5. The device of claim 1, wherein the plurality of data blocks are distributed to a plurality of devices including the device and the other devices.

6. The device of claim 1, wherein pieces of metadata of the plurality of data blocks are stored in a plurality of devices including the device and the other devices.

7. The device of claim 1, wherein a number of data blocks duplicated on a plurality of devices including the device and the other devices is set by a user.

8. The device of claim 1, wherein the processor is further configured to execute the instructions to receive responses to the plurality of transaction fragments from the other devices.

9. The device of claim 1, wherein the processor is further configured to execute the instructions to transmit, when the at least one data block is duplicated on at least two devices of the other devices, a same transaction fragment to the at least two devices.

10. The device of claim 1, wherein, when responses to the plurality of transaction fragments are received from the other devices, the processor is further configured to execute the instructions to evaluate the received responses based on a consensus algorithm.

11. The device of claim 1, wherein the processor is further configured to execute the instructions to:
determine whether the device is able to respond to the transaction based on a data block stored in the device, and
when the device is not able to respond to the transaction based on the data block stored in the device, obtain the location information of the at least one data block corresponding to the transaction.

12. The device of claim 1, wherein the processor is further configured to execute the instructions to:
perform fragmentation on a data block resulting from the transaction to generate fragmented data blocks,
associate the fragmented data blocks with metadata, and
store, based on the metadata, the fragmented data blocks in a plurality of devices including the device and the other devices.

13. The device of claim 12, wherein the processor is further configured to execute the instructions to:
determine a size of the data block resulting from the transaction, and
based on a result of determining whether the memory is able to accommodate the determined size, generate the fragmented data blocks by perform fragmentation on the data block resulting from the transaction.

14. A method comprising:
initiating a transaction by a first device;
obtaining, by the first device, location information of at least one data block of a plurality of data blocks corresponding to the transaction, the location information indicating on which node in a blockchain network the at least one data block is stored;
performing fragmentation by splitting, by the first device, the transaction into a plurality of transaction fragments based on the location information; and
transmitting the plurality of transaction fragments from the first device to second devices where the at least one data block is stored,
wherein the location information of the at least one block is stored in all devices corresponding to nodes in the blockchain network and is obtained by the first device initiating the transaction.

15. A non-transitory computer-readable recording medium having recorded thereon instructions that, when executed by an electronic device, cause the electronic device to:
initiate a transaction by a first device;
obtain, by the first device, location information of at least one data block of a plurality of data blocks corresponding to the transaction, the location information indicating on which node in a blockchain network the at least one data block is stored;
perform fragmentation by splitting, by the first device, the transaction into a plurality of transaction fragments based on the location information; and
transmit the plurality of transaction fragments from the first device to second devices where the at least one data block is stored,
wherein the location information of the at least one block is stored in all devices corresponding to nodes in the blockchain network and is obtained by the first device initiating the transaction.

* * * * *